J. J. WEEKS.
Sausage Stuffer.
No. 2,329.
Reissued Aug. 7, 1866.
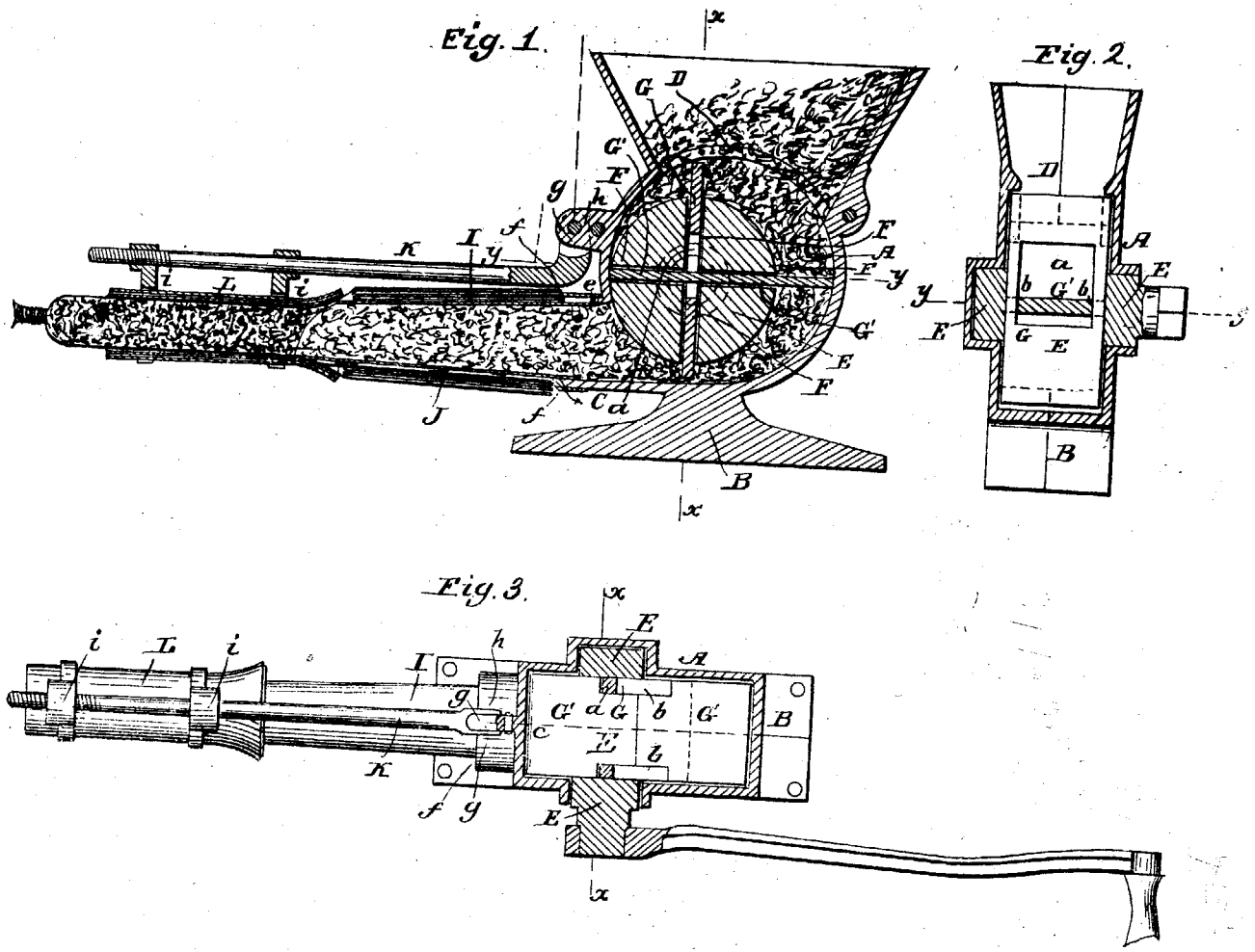

UNITED STATES PATENT OFFICE.

PURCHES MILES, OF NEW YORK, N. Y., ASSIGNEE OF JOHN J. WEEKS.

IMPROVED SAUSAGE-STUFFER.

Specification forming part of Letters Patent No. 11,706, dated September 19, 1854; Reissue No. 2,329, dated August 7, 1866.

*To all whom it may concern:*

Be it known that JOHN J. WEEKS, of Buckram, in the county of Queens and State of New York, did invent a new and useful Improvement in Rotary Sausage-Stuffers; and the following is hereby declared to be a full, clear, and exact description of the same, reference being had to the accompanying drawings, forming part of this specification, in which—

Figure 1 is a vertical longitudinal section of the machine as it appears when in operation. Fig. 2 is a vertical transverse section of the same through the line *x x* in Figs. 1 and 3. Fig. 3 is a horizontal section of the machine through the line *y y* in Figs. 1 and 2.

Similar letters of reference in each of the several figures indicate corresponding parts.

The nature of the said invention consists in a revolving cylinder and conveyer or conveyers eccentric to the cylinder or case, in combination with a hopper for containing meat, and with a tube through which the sausage-meat is delivered and stuffed into a gut or other case. A movable tube is also provided, through which the sausage passes to determine its size and prevent the intestine bursting by the pressure.

To enable others skilled in the art to make and use the invention, its construction and operation are described.

A in the accompanying drawings represents a stationary hollow cylinder provided with a stand or base, B, to rest upon. It is also provided with a tangential discharge-spout, C, and with feed-passage and hopper D, as shown in Fig. 1.

E is a cylinder inside of the cylinder A, and having journals that revolve freely in bearings formed on the said cylinder A eccentric to the axis of the same, as shown in the drawings.

The cylinder E is formed with radial grooves F F, which intersect each other and pass entirely through the cylindrical portion and are as wide as the interior of the case A.

G G are sliding plates or conveyers placed in the grooves F F. These plates are made to act as scrapers and conveyers for taking the meat from the hopper and carrying it round to the discharge-spout C as the cylinder is revolved. The conveyer G is made with a slot, *a*, in its center and G′ has an open slot, *b*, in each of its sides, and is divided at its center, as represented. The slot *a* allows of the conveyer G′ passing through the cylinder E and moving radially back and forth in the groove in the same as the cylinder revolves. The open slots *b b* allow the conveyer G to move radially back and forth as the cylinder revolves. It is by setting the cylinder E eccentric to the cylinder or case A that the desired movement is given to the conveyers as the cylinder is revolved.

By examining the drawings it will be seen that one portion of the periphery of the cylinder E is always in contact, or nearly so, with the part *c* of the inner circumference of the cylinder or case A, as said part *c* is above the discharge-passage C, and either of the conveyers is moved inward as far as it is capable of moving when in contact at one end with the part *c*. There is no chance of the meat being carried round past said point *c*, and consequently it must be discharged continuously by the tube at *c*, as in consequence of the meat being taken continually from the hopper D by one of the conveyers and carried around and forced out at this tube C.

I is a tube placed on the spout C and secured by a lug, *e*, or other means. This tube serves for receiving the case or gut, and is provided with a shoulder, *f*, of sufficient depth to allow of gut of great length being placed on the tube. The gut is placed over the tube in the manner shown in Fig. 1 in red color. On the under side of the tube I a small air-tube, J, is placed. It is open at both ends, and when the gut is drawn over the tube its forward end is closed by the same, and consequently when the meat is forced into the gut or case the air in the same will be caused to pass through said tube and escape at its back end, as shown by red arrows, and thus all danger of bursting the gut or confining the air in with the meat is avoided.

K is a swinging arm carrying the shaping and protecting tube L. It is attached to the ears *g g* of the cylinder A by a fulcrum-pin, *h*. The tube L is attached to the arm K by the eye or guide-piece *i i*, and slides loosely back and forth, so that the arm may be thrown up to a vertical position out of the way when it is desired to place the gut on the tube I.

The tube L serves for giving the proper even hape to the sausage as fast as it is stuffed, and also takes off all extra pressure when more neat than the diameter of the gut can contain is forced into the same.

A series of tubes, as shown in the drawings, may be placed inside of the tube *l*, so that different-sized sausages may be made when desired.

The operation of the machine is very simple. The gut is pulled off the tube the desired length and fastened at its end. The meat is placed in the hopper and the shaft turned continuously. Blades or conveyers take the meat from the hopper and discharge it continuously through the passage C into the case, as illustrated plainly in the drawings. The length of one sausage being stuffed the gut is pulled off another length and filled in like manner, and so on until the whole gut is filled. The proper even shape being given to the same along its entire length by the tube L, and the air being excluded through the tube J, as before stated.

What is claimed as the invention of the said JOHN J. WEEKS, and to be secured by Letters Patent, is—

1. The revolving cylinder and conveyer or conveyers eccentric to the case or cylinder, in combination with a hopper for containing the meat, and with a tube through which the sausage-meat is delivered and stuffed into a gut or intestine, substantially as set forth.

2. The shaping and protecting tube K, in combination with the delivery-tube I, substantially as and for the purposes specified.

Dated this 2d day of July, A. D. 1866.

PURCHES MILES.

Witnesses:

CHAS. H. SMITH,
GEO. D. WALKER.